United States Patent
Rasmussen et al.

(10) Patent No.: US 12,047,748 B2
(45) Date of Patent: Jul. 23, 2024

(54) HEARING DEVICE AND RELATED METHOD OF WIRELESS CHARGING

(71) Applicant: GN Hearing A/S, Ballerup (DK)

(72) Inventors: Kim Rasmussen, Ballerup (DK); Klaus Hagen Jensen, Copenhagen (DK)

(73) Assignee: GN HEARING A/S, Ballerup (DK)

( * ) Notice: Subject to any disclaimer, the term of this patent is extended or adjusted under 35 U.S.C. 154(b) by 315 days.

(21) Appl. No.: 17/540,941

(22) Filed: Dec. 2, 2021

(65) Prior Publication Data

US 2022/0191630 A1    Jun. 16, 2022

(30) Foreign Application Priority Data

Dec. 16, 2020    (DK) .............................. PA202070842

(51) Int. Cl.
| H04R 25/00 | (2006.01) |
| H02J 7/00 | (2006.01) |
| H02J 50/12 | (2016.01) |

(52) U.S. Cl.
CPC .......... H04R 25/554 (2013.01); H02J 7/0044 (2013.01); H02J 50/12 (2016.02); H04R 25/30 (2013.01); H04R 2225/31 (2013.01)

(58) Field of Classification Search
CPC .. H04R 1/1025; H04R 2225/31; H04R 25/30; H04R 25/554; H04R 25/556
USPC .......................................................... 381/323
See application file for complete search history.

(56) References Cited

U.S. PATENT DOCUMENTS

| 2010/0007307 A1 | 1/2010 | Baarman et al. |
| 2012/0223590 A1 | 9/2012 | Low et al. |
| 2019/0097447 A1 | 3/2019 | Partovi |

FOREIGN PATENT DOCUMENTS

| EP | 3340009 | 6/2018 |
| EP | 3573079 | 11/2019 |
| EP | 3585063 | 12/2019 |
| EP | 3605781 | 2/2020 |
| WO | WO 2014/044292 | 3/2014 |

OTHER PUBLICATIONS

1st Technical Examination for Danish Patent Appln. No. PA 2020 70842 dated Mar. 9, 2021.
Extended European Search Report for EP Patent Appln. No. 21211228.8 dated May 13, 2022.

*Primary Examiner* — Phylesha Dabney
(74) *Attorney, Agent, or Firm* — Vista IP Law Group, LLP (57) ABSTRACT

A hearing device and a method for charging a hearing device is provided, the hearing device comprising an interface comprising a wireless transceiver configured for wireless communication with a charging device; and a power module comprising a charging controller and a receiving coil for wireless charging of a battery positioned in the hearing device; wherein the charging controller is configured to: obtain a first charging parameter; determine a primary charging scheme based on the first charging parameter; and transmit a primary charging indicator indicative of the primary charging scheme via the wireless transceiver.

15 Claims, 4 Drawing Sheets

HEARING DEVICE AND RELATED METHOD OF WIRELESS CHARGING

RELATED APPLICATION DATA

This application claims priority to, and the benefit of, Danish Patent Application No. PA202070842 filed on Dec. 16, 2020. The entire disclosure of the above application is expressly incorporated by reference herein.

FIELD

The present disclosure relates to a hearing device and related methods including a method for charging of a hearing device. Further, a charging device for a hearing device is disclosed.

BACKGROUND

In the field of hearing devices, charging of a hearing device entails challenges for the hearing device users, especially those currently being operated by a user. For example, charging of a hearing device can cause excessive energy output to the hearing device under certain conditions. This excessive energy output can lead to damage to the hearing device, certain components of the hearing device, and/or a user of the hearing device.

SUMMARY

Accordingly, there is a need for devices and methods with improved charging of a hearing device.

A hearing device, e.g., configured to be worn at, in or on an ear of a user, is disclosed. The hearing device can comprise an interface. The interface can comprise a wireless transceiver. The wireless transceiver can be configured for wireless communication, e.g. with a charging device. The hearing device can comprise a power module. The power module can comprise a charging controller. The power module can comprise a receiving coil for wireless charging of a battery. The battery may be positioned in the hearing device. The charging controller can be configured to obtain a first charging parameter. The charging controller can be configured to determine a primary charging scheme, e.g. based on the first charging parameter. The charging controller can be configured to transmit a primary charging indicator, e.g. indicative of the primary charging scheme, via the interface, such as the wireless transceiver.

Further, a method of charging a hearing device comprising an interface comprising a wireless transceiver configured for wireless communication with a charging device, and a power module comprising a charging controller and a receiving coil for wireless charging of a battery positioned in the hearing device is disclosed. The method can comprise obtaining a first charging parameter, e.g. with the charging controller. The method can comprise determining a primary charging scheme, e.g. with the charging controller. The primary charging scheme can be based on the first charging parameter. The method can comprise transmitting a primary charging indicator, e.g. via the interface, such as the wireless transmitter. The primary charging indicator can be indicative of the primary charging scheme via the wireless transceiver.

Also, a charging device for charging of a hearing device is disclosed, the charging device comprising an interface comprising a wireless transceiver configured for wireless communication with a hearing device; and a power module comprising a charging controller and a transmitting coil for wireless transfer of power to a receiving coil of the hearing device. The charging controller of the charging device is configured to apply a default charging scheme in the power module; receive a primary charging indicator from the hearing device via the wireless transceiver; determine if the primary charging indicator is indicative of a change in charging scheme; in accordance with a determination that the primary charging indicator is indicative of a change in charging scheme, select a primary charging scheme based on the primary charging indicator; and apply the primary charging scheme in the power module.

The present disclosure provides a hearing device with improved charging capabilities. The present disclosure allows a hearing device to send control data through a data connection between the hearing device and a charger to regulate an amount of energy delivered to the hearing device.

For example, excess amounts of energy to the hearing device can be regulated and/or reduced and/or avoided. This can prevent damage to the hearing device and/or a user of the hearing device. For example, during wireless charging the hearing device may overheat due to the Tx side (charger) providing an excessive amount of energy and the excess being dissipated in regulator(s), etc., inside the electronics of the hearing device. This could force replacement of components of the hearing device, or the entire hearing device itself.

The improved charging capability results in improved usage of the hearing device, e.g., providing longer lifespans to the hearing device by avoiding overheating. Further, the present disclosure allows for simplification of hearing device charging which allows for more hearing aid models to be used with the same charger (e.g., less need for tight mechanical fits to connectors).

In other words, by controlling and/or regulating the charging capabilities of a hearing device, hearing device longevity and usability can be increased.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The hearing device is configured to be worn at, on or in an ear of a user. The hearing device may be arranged at the user's ear, on the user's ear, in the user's ear, in the user's ear canal, behind the user's ear, and/or in the user's concha, i.e., the hearing device is configured to be worn in, on and/or at the user's ear.

The hearing device may be an ear bud, a hearing aid, a personal sound amplification product (PSAP), an over-the-counter (OTC) hearing device, a hearing protection device, a custom hearing device or another ear-wearable hearing device. Hearing devices can include both prescription devices and non-prescription devices.

The hearing device may be embodied in various housing styles/form factors. Some of these form factors are a Behind-the-Ear (BTE) hearing device, a Receiver-in-Canal (RIC) hearing device, a Receiver-in-Ear (RIE) hearing device, or a Microphone-and-Receiver-in-Ear (MaRIE) hearing device. These devices have in common that they may comprise a BTE component configured to be worn behind the ear of the user and an in the ear (ITE) component configured to be inserted partly or fully into the user's ear canal. Generally, the BTE component may comprise at least one input transducer, a power source, and a processing unit. The term BTE hearing device may refer to a hearing device where the receiver, i.e. the output transducer, is comprised in the BTE component and sound is guided to the ITE component via a sound tube connecting the BTE and ITE components, whereas the terms RIE, RIC, and MaRIE devices refers to hearing devices where the receiver is comprised in the ITE component, which is coupled to the BTE component via a connector cable or wire configured for transferring electric signals between the BTE and ITE components.

Some of these form factors are In-the-Ear (ITE) hearing device, Completely-in-Canal (CIC) hearing device, or Invisible-in-Canal (IIC) hearing device. These hearing devices may comprise an ITE component, wherein the ITE component may comprises at least one input transducer, a power source, a processing unit, and an output transducer. These form factors may be custom devices, meaning that the ITE component may comprises a housing having a shell made from a hard material, such as a hard polymer or metal, or a soft material such as a rubber-like polymer, molded to have an outer shape conforming to the shape of the specific user's ear canal.

Some of these form factors are cochlear implant comprising a BTE component and an implant component. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

The hearing device may be configured for wireless communication with, e.g. reception of wireless signals from and/or transmission of wireless signals, such as control signals, to one or more devices, such as with another hearing device, e.g. as part of a binaural hearing system, and/or with one or more accessory devices, such as a smartphone and/or a charging device and/or a smart watch. The hearing device optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a wireless transceiver or radio transceiver e.g. also denoted or forming part of magnetic induction unit, coupled to the antenna (e.g. as part of the magnetic induction unit) for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device optionally comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal. The set of microphones may provide one or more input signals to the processing unit. The processing unit may process input signal(s) from the one or more microphones and/or optionally a radio transceiver. The processing unit may provide an output signal to a receiver, such as an output transducer, for conversion to an audio output signal.

The hearing device comprises a processing unit for processing input signals, such as (optionally pre-processed) transceiver input signal(s) from magnetic induction unit and/or (optionally pre-processed) microphone input signal(s) from the microphone(s). The processing unit is optionally configured to compensate for hearing loss of a user of the hearing device. The processing unit provides an electrical output signal based on the input signals to the processing unit.

The hearing device may comprise a first housing and optionally a second housing. A housing, such as the first housing and/or the second housing, may be configured to accommodate one or more of the processing unit, a main power source (battery), a first power supply, a magnetic induction unit, and a second power supply. The hearing device may be of the in-the-ear (ITE) type or in-the-canal (ITC) type and comprise a first housing configured as an in-the-ear housing to be worn in or at the ear canal of a user. As an alternative the hearing device may comprise a first housing optionally configured as a behind-the-ear housing to be worn behind the pinna of a user and optionally a second housing optionally configured as an earpiece housing to be worn in or at the ear canal of a user. A wire may connect the first housing and the second housing.

In one or more example hearing devices, the hearing device is configured to be worn at, in, or on an ear of a user, the hearing device comprising: an interface comprising a wireless transceiver configured for wireless communication with a charging device; a power module comprising a charging controller and a receiving coil for wireless charging of a battery positioned in the hearing device; and a temperature sensor configured to provide temperature data indicative of a temperature in the hearing device, wherein the charging controller is configured to obtain the temperature data as a first charging parameter indicative of a temperature in the hearing device; determine a primary charging scheme based on the first charging parameter; and transmit a primary charging indicator indicative of the primary charging scheme via the wireless transceiver.

The hearing device comprises a main power source, such as a battery. The main power source may comprise a power output terminal for providing electrical power to electrical components of the hearing device, such as one or more of a processing unit, magnetic induction unit, and power module. The main power source may be positioned in the hearing device.

The main power source may comprise a power source, such as one or more batteries and/or battery packs. The main power source may comprise one or more power sources, such as one or more batteries, e.g. a battery pack comprising one or more batteries, such as one battery, two batteries, three batteries. The main power source may comprise one or more batteries, such as button cell batteries. At least some of the one or more batteries may comprise one or more of Lithium batteries, Nickel batteries, and/or Lead batteries. The battery/batteries may be air-activated. At least one of the main power source is a rechargeable battery, e.g. via power module of the hearing device. The main power source may be rechargeable via a connector of interface for connecting a power cable. The main power source may be rechargeable wirelessly.

One or more exemplary hearing devices can include particular methods and systems for charging the hearing device. In particular, one or more exemplary hearing devices, hearing devices can have configurations (e.g., systems, components) for requesting different charging schemes, for example having different energies, from one or more charging devices. These charging parameters can be based on parameters and/or indicators of the hearing device itself.

One or more exemplary hearing devices can include an interface having a wireless transceiver for wireless communication, as mentioned above. The wireless transceiver may be configured for wireless communication, e.g. in the 2.4 GHz band, with a charging device (e.g., apparatus, system, component). Thus, the hearing device, such as the power module, can request and/or control energy/charging power from a charging device in order to wirelessly charge a main power source/battery in the hearing device. The hearing device can then convert that energy to voltage and/or current as needed in the hearing device.

One or more exemplary hearing devices can include a power module. The power module can be used for charging of the main power source, such as a battery. The power module may be in electrical communication with the main power source. One or more exemplary hearing devices can include multiple power modules for multiple power sources. The power module may be in electrical communication with the interface, e.g. for feeding control parameters, such as charging indicator(s) including the first charging parameter, to the interface.

The power module can comprise a receiving coil. The receiving coil can receive a wireless signal, which can then be converted to electrical energy for powering and/or recharging the main power source/battery. Other charging methods can be used as well, and the particular power module with receiving coil is not limiting. Thus, the hearing device (for example, the main power source) may be wirelessly charged or charged by wire from a charging device.

An example wireless charging system for wirelessly charging the hearing device is Qi, which is a standardized wireless charging system. Alternative charging systems can be used as well. For example, radiofrequency charging, electromagnetic induction, magnetic resonance, electric field coupling, and/or radio reception can all be used for charging the hearing device.

Further, the power module may include a charging controller (e.g., system, accessory, device, component, programming). The charging controller can control and/or request different levels of energy output from a charging device, e.g. by transmitting charging indicator(s), such as primary charging indicator via the wireless transmitter. The charging controller can change an energy output request to a charging device. The charging controller can request a stop of energy from the charging device. The charging controller can request an increase and/or decrease of energy from a charging device. Thus, the charging controller can control or modify the amount of energy sent from the charging device to the hearing device, preventing, for example, overheating or damage to the hearing device.

The charging controller may be configured to obtain a first charging parameter. The first charging parameter can be indicative of a particular state, characteristic, level (e.g., battery level or charge level or temperature level), and/or operating parameter of the hearing device and/or one or more components of the hearing device. In one or more exemplary hearing devices, the first charging parameter can be indicative of temperature of the hearing device, and the hearing device may include a temperature sensor (e.g., detector). In one or more exemplary hearing devices, the first charging parameter can be indicative of a voltage over the receiving coil, and the hearing device may include a voltage detector. In one or more exemplary hearing devices, the first charging parameter can be indicative of a current over the receiving coil, and the hearing device may include a current detector. One or more exemplary hearing devices can have a temperature sensor and/or a voltage detector and/or a current detector optionally connected to the power module/charging controller.

As mentioned, in one or more implementations the first charging parameter can be indicative of a temperature of the hearing device. For example, the hearing device, such as the power module, can include a temperature sensor configured to provide temperature data as the first charging parameter to the charging controller. In one or more exemplary hearing devices, the first charging parameter can be indicative of pressure, humidity, motion, height, and/or other physical characteristics of the hearing device and/or one or more components of the hearing device. Thus, the hearing device can include one or more sensors indicative of or sensing one or more physical characteristics of the hearing device. The one or more sensors may be connected to the power module/charging controller.

The temperature sensor may be configured to measure a temperature, such as a temperature of the hearing device, e.g. at temperature of at least one of the power module, the charging controller, the receiving coil, and the battery. In other words, the temperature data may be indicative of a temperature of at least one of the power module, the charging controller, the receiving coil, and the battery.

In one or more exemplary hearing devices, the charging controller is configured to obtain one or more, such as a plurality of, charging parameters including the first charging parameter and optionally one or more of a second charging parameter, a third charging parameter, etc. The second charging parameter and/or third charging parameter can be indicative of pressure, humidity, motion, height, and/or other physical characteristics of the hearing device and/or one or more components of the hearing device. Thus, the hearing device can include one or more sensors indicative of one or more physical characteristics of the hearing device. In certain implementations, the second charging parameter can be indicative of a battery level, such as a battery voltage, of the hearing device. In alternative embodiments, the first charging parameter can be indicative of a voltage over the receiving coil, and the hearing device may include a voltage detector. In alternative embodiments, the first charging parameter can be indicative of a current over the receiving coil, and the hearing device may include a current detector.

The charging controller can be configured to determine a primary charging scheme based on the first charging parameter. In one or more exemplary hearing devices, the charging controller can determine a charging scheme, such as the primary charging scheme and/or a secondary charging scheme, based on a secondary charging parameter. In one or more exemplary hearing devices, the charging controller can determine the primary charging scheme based on one or more, such as a plurality of, charging parameters, such as a first charging parameter and a second charging parameter.

The primary charging scheme may define, be representative or indicative of a particular energy output level requested from a charging device. Thus, in one or more exemplary hearing devices, the charging controller can be configured to determine a desired energy receipt from a charging device based on the first charging parameter. For example, the charging controller can be configured to determine a desired energy receipt from a charging device based on a temperature of the hearing device.

The primary charging scheme may be selected from a set (e.g., group, list, collection) of charging schemes. The set of charging schemes can include a set of different charging schemes, e.g. each representative of a different energy output level request. The charging schemes may be pre-made or pre-defined charging schemes having different associated energy output level requests. The charging schemes may alternatively be computed by a processor based on charging parameter(s), such as the first charging parameter.

In one or more exemplary hearing devices, the set of charging schemes can include a normal charging scheme, wherein normal operating energy, leading to normal operating current and voltage, is requested from the charging device. In one or more exemplary hearing devices, the set of charging schemes can also include an off (e.g., no power) charging scheme, wherein no energy is requested from the charging device.

In one or more exemplary hearing devices, the set of charging schemes can include a reduced energy charging scheme, wherein reduced energy, energy between 0 and normal, such as about 50% of normal or default, is requested from the charging device. This can lead to reduced voltage and/or reduced current to provide a less aggressive charging which reduces the wear and/or stress on the components of the hearing device. In one or more exemplary hearing devices, the set of charging schemes can include an increased energy charging scheme, wherein increased energy, energy above normal, is requested from the charging device. This can lead to increased voltage and/or increased current in turn reducing the charging time and providing a more aggressive charging of the hearing device.

In one or more exemplary hearing devices, the set of charging schemes can further include a reduced current charging scheme, wherein a current between the normal operating current and no current is requested from the charging device. In one or more exemplary hearing devices, the group of charging schemes can further include a reduced voltage charging scheme, wherein a voltage between the normal operating voltage and no current is requested from the charging device.

In one or more exemplary hearing devices, the group of charging schemes can further include an increased voltage charging scheme, wherein a voltage above the normal operating voltage is requested from the charging device. In one or more exemplary hearing devices, the group of charging schemes can further include an increased current charging scheme, wherein a current above the normal operating current is requested from the charging device.

Other charging schemes can be used as well, and the particular charging scheme is not limiting. Further, the primary charging scheme may be a particular voltage and/or current level to be requested from a charging device.

Thus, based on the first charging parameter, one of the above charging schemes can be determined based on the first charging parameter. In turn, based on the first charging parameter a particular energy output can be requested from the charging device.

In one or more exemplary hearing devices, the charging controller can transmit a primary charging indicator. The primary charging indicator can be indicative of the primary charging scheme, e.g. as selected from a set of charging schemes. For example, the primary charging indicator can be indicative of one of the above-discussed charging schemes. The charging controller can transmit the primary charging indicator via a wireless transceiver, e.g. in the 2.4 GHz band. The wireless transceiver can, for example, wirelessly communicate with one or more charging devices. In one or more exemplary hearing devices, the primary charging indicator can include a request for a particular energy level (e.g., the primary charging scheme) from a charging device.

Thus, the charging device would provide the requested energy output of the primary charging scheme. The primary charging indicator may be data or datum, flags, or other indicators. For example, the primary charging indicator may comprise one or more bits, such as multiple bits. The charging indicator may a byte or less than a byte.

The primary charging indicator can be indicative of a charging power and/or a duty cycle of the primary charging scheme. The primary charging indicator can be indicative of a charging power of the primary charging scheme. The primary charging indicator can be indicative of a duty cycle of the primary charging scheme. In certain implementations, the primary charging indicator may be indicative of a reduction or increase (e.g., a change) of a charging power and/or a duty cycle of the primary charging scheme.

In one or more exemplary hearing devices, and as discussed below, based on the received primary charging indicator, the charging device could output an energy level based on the primary charging scheme that the primary charging indicator is indicative of.

For example, if the primary charging scheme was a normal charging scheme, the charging device could output a normal energy level to provide a normal level of voltage and current to the hearing aid. If the primary charging scheme was an off-charging (or no charge) scheme, the charging device would not output any energy to the hearing device. Further, the primary charging indicator may indicate a change of a charging scheme. For example, from a normal energy scheme to a reduced energy scheme. The primary charging indicator may not cause any change within the charging device in certain situations where there is no need to change energy output.

In one or more exemplary hearing devices, the determining of the charging controller of a primary charging scheme based on the first charging parameter may involve certain criteria, specifically one or more criteria. For example, the determining can determine if a first charging criterion based on the first charging parameter is satisfied. In accordance with the first charging criterion being satisfied (e.g., if the first charging criterion is satisfied), the charging controller can be configured to select a first charging scheme with associated first charging indicator as the primary charging scheme. The selection of the first charging scheme can be from a set of charging schemes as the primary charging scheme, such as discussed above.

The first charging criterion may be, for example, a temperature criterion. Thus, the first charging criterion can be satisfied if a temperature of the hearing device, such as from a temperature sensor, is larger than a first threshold or is in a first range. Further, the first charging criterion can be satisfied if the temperature is below a second threshold. In some implementations, the first charging criterion can be satisfied if a temperature of the hearing device is between the first threshold and the second threshold. If the first charging criterion is satisfied with the temperature being larger than a first threshold and/or less than a second threshold, the first charging scheme can have a reduced charging power. If the first charging criterion is satisfied with the temperature being larger than a first threshold and/or less than a second threshold, the first charging scheme can have a reduced voltage. If the first charging criterion is satisfied with the temperature being larger than a first threshold and/or less than a second threshold, the first charging scheme can have a reduced current.

In some implementations, the first charging criterion can be made up of a number of different threshold ranges. For example, the first charging criterion could have a first threshold range, a second threshold range, a third threshold range, a fourth threshold range, and/or a fifth threshold range. Thus, the first charging parameter could be within one of the threshold ranges, and the primary charging scheme would be selected based on the particular threshold range.

As a non-limiting example, the first charging parameter could be a temperature value of the hearing device. The first charging criterion could be a number of temperature threshold ranges. These can include a "too cold" temperature threshold range, a "cool" temperature threshold range, a "normal" temperature threshold range, a "warm" temperature threshold range, and a "hot" temperature threshold range. The primary charging scheme may then vary depending on the particular temperature threshold range the first charging parameter is in.

For example, the primary charging scheme may be an off-charging scheme for too cold, a reduced current charging scheme with reduced current for cool, normal charging scheme for normal, a reduced voltage charging scheme for warm, and an off-charging scheme for hot.

In alternative implementations, the first charging criterion could be a normal temperature threshold range, and an abnormal temperature threshold range. The primary charging scheme may be a normal charging scheme, whereas the abnormal temperature range may not receive any current or voltage (e.g., be an off-charging scheme).

Example temperature threshold ranges can include below 0° C. (e.g., too cold), from 0-10° C. (e.g., cool), from 11-45° C. (e.g., normal), from 46-56° C. (e.g., warm), and from above 56° C. (e.g., hot). However, other temperature ranges can be used as well. For example, from 10° C. to 56° C. could be a normal temperature range, and a temperature outside would be abnormal.

As mentioned above, in certain implementations the charging controller can be configured to obtain a second charging parameter along with a first charging parameter. The charging controller can then determine a primary charging scheme bey determining if a second charging criterion based on the first charging parameter and/or the second charging parameter is satisfied. In accordance with the second charging criterion being satisfied (e.g., if the second charging criterion is satisfied), the charging controller can be configured to select a second charging scheme. The second charging scheme may be associated with a second charging indicator. The second charging scheme may be selected from a set of charging schemes as the primary charging scheme.

As an example, and mentioned above, the second charging parameter can be indicative of a battery level in the hearing device. The battery level can be a particular percentage of a total battery level. In certain implementations, the battery level can be particular intervals of a total battery level. For example, 5, 6, 7, 8, 9, or 10 intervals. A second charging criterion can be satisfied if a change in the battery level over time is less than a second threshold. If so, the second charging scheme has an increased charging power.

In one or more exemplary hearing devices, the primary charging scheme may be based on a current charging scheme. Thus, the primary charging scheme may not change any output of the charging device. In other words, the charging controller may determine a primary charging scheme based on a currently employed charging scheme, e.g. in order to prevent rapid changes in the charging voltage and/or current.

In one or more exemplary hearing device systems, a charging device for a hearing device is disclosed. The charging device can be used alone, or in conjunction with the one or more exemplary hearing devices and methods disclosed herein.

One or more exemplary charging devices can include an interface. The interface can include a wireless transceiver. The wireless transceiver can be configured for wireless communication, e.g. in the 2.4 GHz band, with a hearing device, such as a hearing device of the one or more exemplary hearing devices disclosed above.

One or more exemplary charging devices can include a power module. The power module may comprise a charging controller. The power module can include a transmitting coil. The transmitting coil can wirelessly transfer power externally. For example, the transmitting coil can transmit power to a receiving coil, such as a receiving coil of one or more exemplary hearing devices disclosed herein.

In one or more exemplary charging devices, the charging controller can be configured to apply a default charging or normal charging scheme in the power module. The default charging scheme can include outputting the normal energy scheme as discussed above. In alternative embodiments, the default charging scheme may be the current charging scheme, such as after the disclosed change to the primary charging scheme. Therefore, once the charging device has applied a primary charging scheme, this may be the new default charging scheme.

In one or more exemplary charging devices, the charging controller can further be configured to receive a primary charging indicator, such as from the hearing device. The charging controller can be configured to receive a primary charging indicator via the wireless transmitter.

In one or more exemplary charging devices, the charging controller can be configured to determine if the primary charging indicator would be indicative of a change in charging scheme. For example, it could be indicative of a change in charging scheme from the default charging scheme.

In accordance with a determination that the primary charging indicator is indicative of a change in charging scheme, the charging controller can be configured to select a primary charging scheme. This can be based on the primary charging indicator. The primary charging scheme may be one of the primary charging schemes discussed in detail above.

In one or more exemplary charging devices, the charging controller of the charging device can be configured to apply the primary charging scheme in the power module, e.g. according to the primary charging indicator received from the hearing device. Accordingly, the charging controller could output varying energy levels to one or more exemplary hearing devices.

In one or more exemplary hearing devices, the hearing device may have a particular method of charging.

In one or more exemplary methods, the hearing device may include an interface. The interface may include a wireless transceiver. The wireless transceiver may be configured for wireless communication with a charging device, such as discussed above.

The interface may further include a power module. The power module may include a charging controller. The power module may further include a receiving coil. The receiving coil may be used for wirelessly charging the main power source, which may include any or all of the power sources discussed above.

In one or more exemplary methods, the method can include obtaining a first charging parameter. The first charging parameter can be any or all of the first charging parameters discussed in detail above.

In one or more exemplary methods, the method can include determining a primary charging scheme. This may be based on the first charging parameter. The primary charging scheme may be any or all of the primary charging schemes discussed in detail above.

In one or more exemplary methods, the method can include transmitting a primary charge indicator. This may be transmitted to a charging device. The primary charge indicated may be indicative of the primary charging scheme. The transmitting may be performed via the wireless transceiver. The primary charge indicator may be any or all of the primary charging indicators discussed in detail above.

Advantageously, the one or more exemplary methods can allow for charging of the hearing device, while preserving longevity to the hearing device and preventing harm to the hearing device and/or a user of the hearing device. As discussed, the method can vary the request of energy levels from a charging device based on varying conditions of the hearing device. In one or more exemplary methods, the method can prevent overheating of a hearing device based on, for example, temperature of the hearing device. When the hearing device is outside of normal operating temperatures, the method can transmit a primary charging indicator indicative of a lessened current or voltage wirelessly to the charging device.

Figure 1:
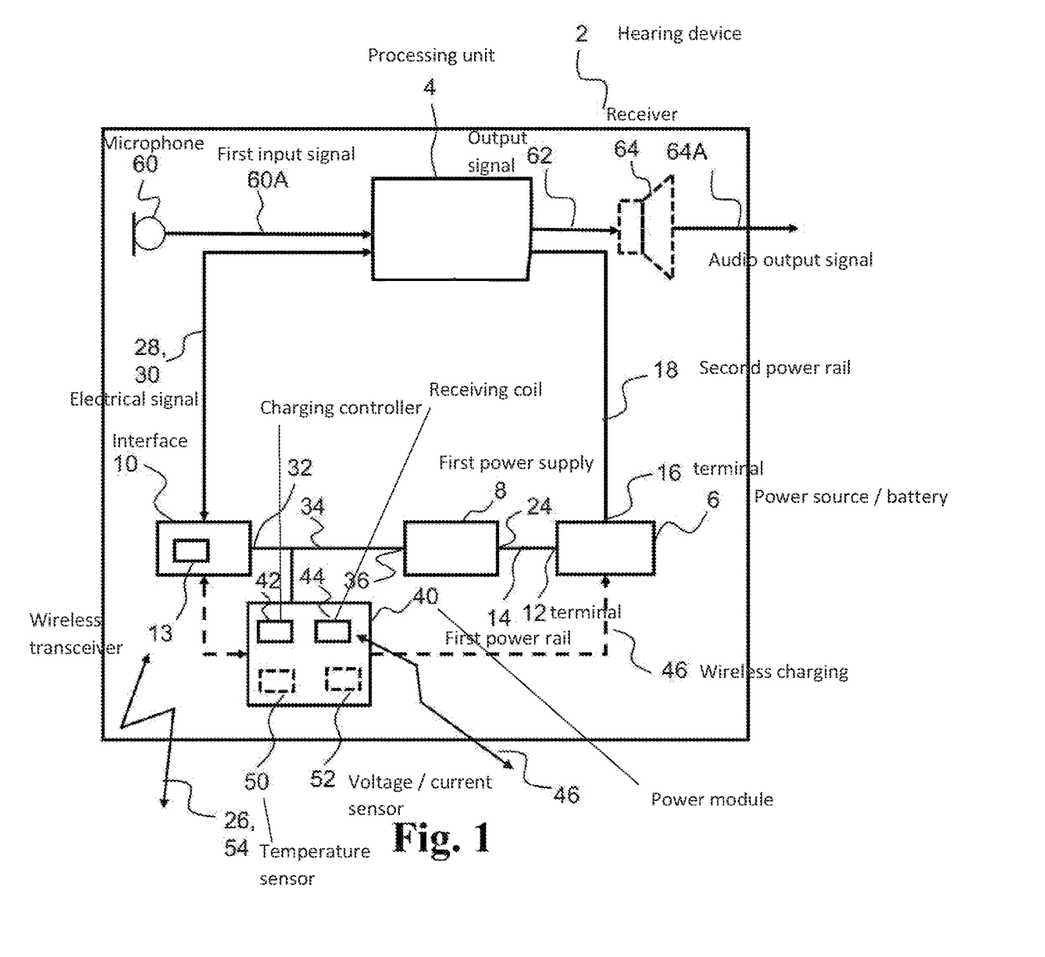
FIG. 1 is a schematic block diagram of an exemplary hearing device.

FIG. 1 schematically illustrates an exemplary hearing device. The hearing device 2 comprises a processing unit 4.

The processing unit 4 may be configured to compensate for hearing loss. The hearing device 2 comprises a main power source (e.g., battery) 6, a first power supply 8, and an interface 10. The main power source 6 may comprise one or more power output terminals for providing electrical power to electrical components of the hearing device 2 via one or more power rails. For example, the main power source 6 comprises a first power output terminal 12 connected to a first power rail 14 for feeding a first voltage/power to one or more electrical components including the first power supply 8. The first power rail 14 may feed the processing unit 4. A second power output terminal 16 of the main power source 6 may be connected to a second power rail 18, e.g. for feeding a second voltage/power to the processing unit 4.

In one or more exemplary hearing devices, a second power output terminal (not shown) of the first power supply 8 may be connected to a second power rail 18, e.g. for feeding a second voltage/power to the processing unit 4.

The hearing device 2 comprises an interface 10 having a wireless transceiver 13 configured for reception and/or transmission of wireless signals including a first wireless signal 26, for example to a charging device. The first wireless signal 26 may comprise the primary charging indicator. The interface 10 may be configured to convert the first wireless signal 26 to an electrical signal 28 that is fed to the processing unit 4 and/or to convert an electrical signal 30 from the processing unit 4 to first wireless signal 8. The electrical signals 28, 30 may be data and/or control signals. The interface 10 comprises a power input terminal 32 for receiving power from the first power supply 8 via transceiver power rail 34.

The first power supply 8 optionally is a switch-mode power and is connected to the main power source/battery 6 for providing electrical power to one or more electrical components of the hearing device including the interface 10 and/or a power module 40. The first power supply 8 comprises a power input terminal 24 connected to the first power rail 14 for receiving power from the main power source 6. The first power supply 8 comprises a first power output terminal 36 for feeding power to the interface 10 and/or the power module via transceiver power rail 34. The power module 40 may be fed via second power rail 18.

The hearing device 2 comprises a power module 40. The power module 40 can include a charging controller 42 and a receiving coil 44. The receiving coil 44 may be used for wireless charging 46 of the main power source 6 via the receiving coil 44 and connection 48. In other words, the power module 40 receives wireless power 46 via receiving coil 44 and charges the main power source/battery 6 with power from the receiving coil 44 via connection 48.

The hearing device 2, such as power module 40, may comprise one or more sensors, such as temperature sensor 50 and/or voltage/current sensor or detector 52 for provision of sensor data. The sensors 50, 52 may be connected to the charging controller 42 for feeding sensor data/output, such as temperature and/or voltage/current, as charging parameters to the charging controller 42. In the illustrated hearing device, the sensors are included in the power module 40, however one or more sensors may be arranged in other components of the hearing device 2.

The charging controller 42 may be configured to obtain a first charging parameter, such as a temperature from temperature sensor 50, determine a primary charging scheme based on the first charging parameter, and transmit a primary charging indicator 54 indicative of the primary charging scheme via the wireless transceiver 13 via wireless connection 26. In one or more exemplary hearing devices, the primary charging indicator 54 indicative of the primary charging scheme may be transmitted via the receiving coil 44.

The hearing device 2 may comprise one or more microphones including microphone 60 for provision of one or more input signals including a first input signal 60A to the processing unit 4. The processing unit 4 processes input signal(s) including first input signal 60A from the microphone 60 and/or optionally electrical signal 28 from interface 10/wireless transceiver 13 and provides an output signal 62 to a receiver 64, such as an output transducer, for conversion of the output signal 62 to an audio output signal 64A.

Figure 2:
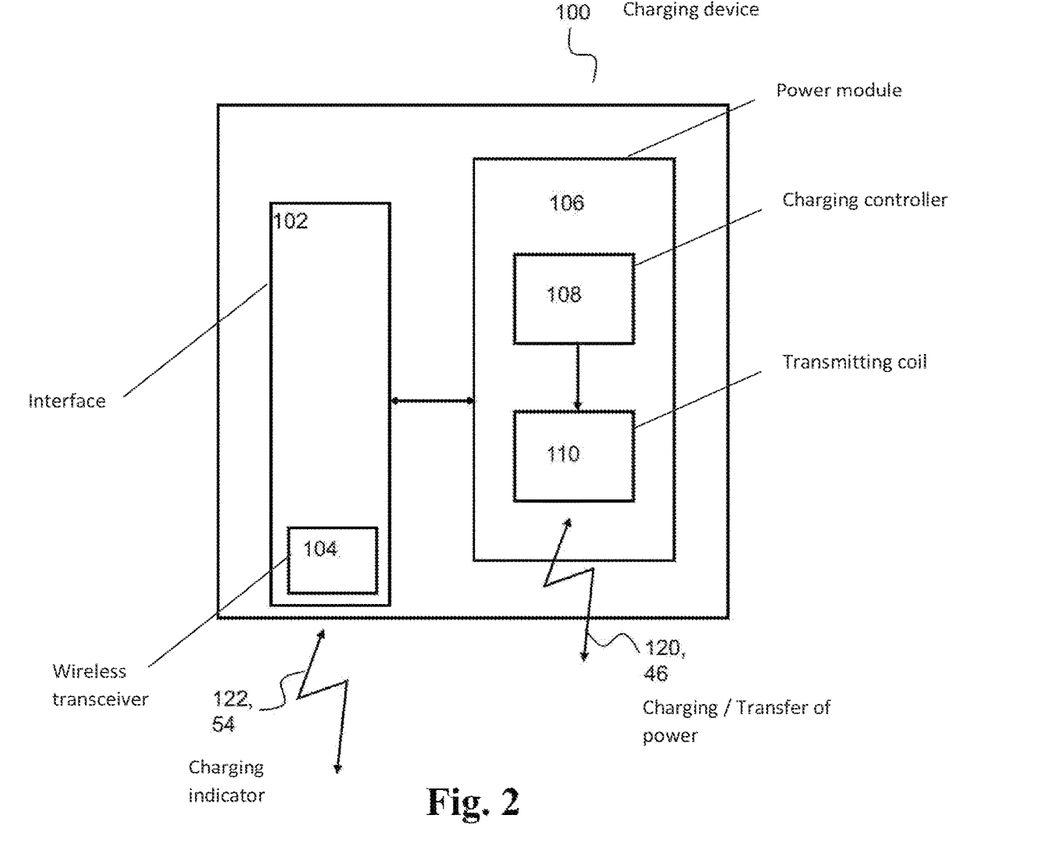
FIG. 2 is a schematic block diagram of an exemplary charging device.

FIG. 2 schematically illustrates an exemplary charging device. The charging device 100 can be used to charge hearing device, such as hearing device 2 of FIG. 1.

The charging device 100 comprises an interface 102 which can include a wireless transceiver 104. The wireless transceiver 104 can be configured for wireless communication, e.g. in the 2.4 GHz band, such as with the hearing device 2 of FIG. 1.

The charging device 100 also comprises a power module 106 configured for wireless charging 46 of hearing devices. The power module 106 can comprise a charging controller 108 and a transmitting coil 110 for the wireless transfer of power 120, such as to a receiving coil of a hearing device like the hearing device 2 of FIG. 1.

The charging controller 108 is configured to receive charging indicators including primary charging indicator 54 via the wireless transceiver 104.

The charging controller 108 can be configured to apply a default charging scheme in the power module, receive a primary charging indicator 54 from the hearing device 2 via the wireless transceiver 104, determine if the primary charging indicator is indicative of a change in charging scheme, in accordance with a determination that the primary charging indicator is indicative of a change in charging scheme, select a primary charging scheme based on the primary charging indicator, and apply the primary charging scheme in the power module 106. To apply the primary charging scheme in the power module 106 may comprises to transmit wireless power with the transmitting coil according to the primary charging scheme, e.g. according to one or more of voltage and current applied to the transmitting coil.

Figure 3:
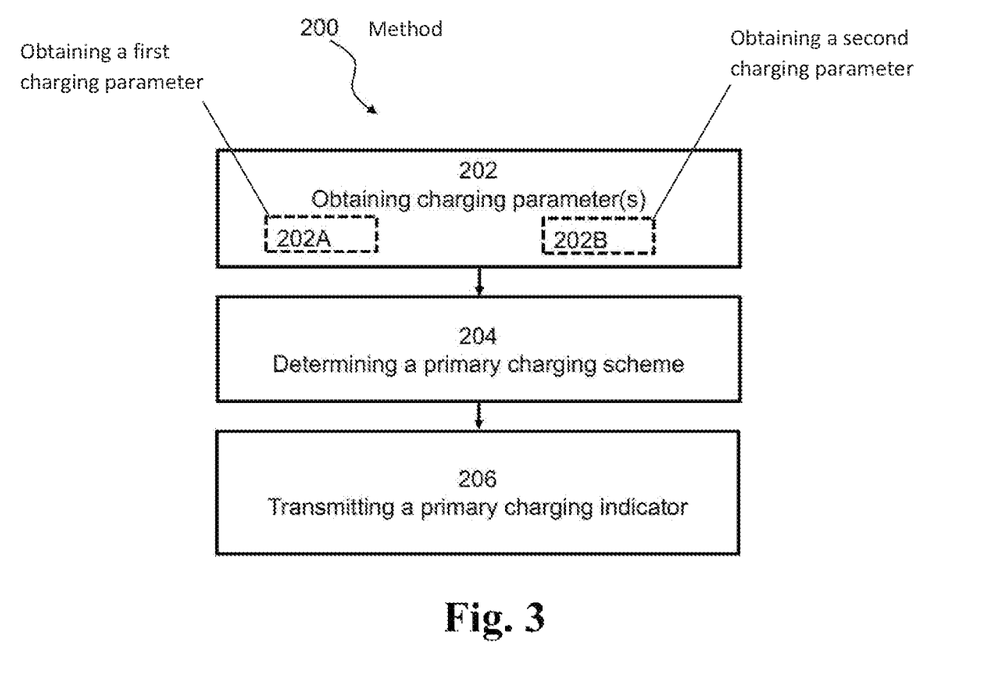
FIG. 3 is a flow diagram of an exemplary method according to the disclosure.

FIG. 3 is a flow diagram of an exemplary method according to the disclosure, such as a method 200 performed in a hearing device (such as the hearing device disclosed herein, such as the hearing device 2 of FIG. 1), for charging of a hearing device comprising an interface comprising a wireless transceiver configured for wireless communication with a charging device, and a power module comprising a charging controller and a receiving coil for wireless charging of a battery positioned in the hearing device. The method 200 comprises obtaining 202 one or more charging parameters. In other words, the method 200 comprises obtaining 202A a first charging parameter and optionally obtaining 202B a second charging parameter.

In one or more exemplary methods and/or hearing devices, the method 200 comprises determining 204 a primary charging scheme based on the first charging parameter and/or the second charging parameter.

In one or more exemplary methods and/or hearing devices, the method 200 comprises transmitting 206 a primary charging indicator indicative of the primary charging scheme via the wireless transceiver.

Figure 4:
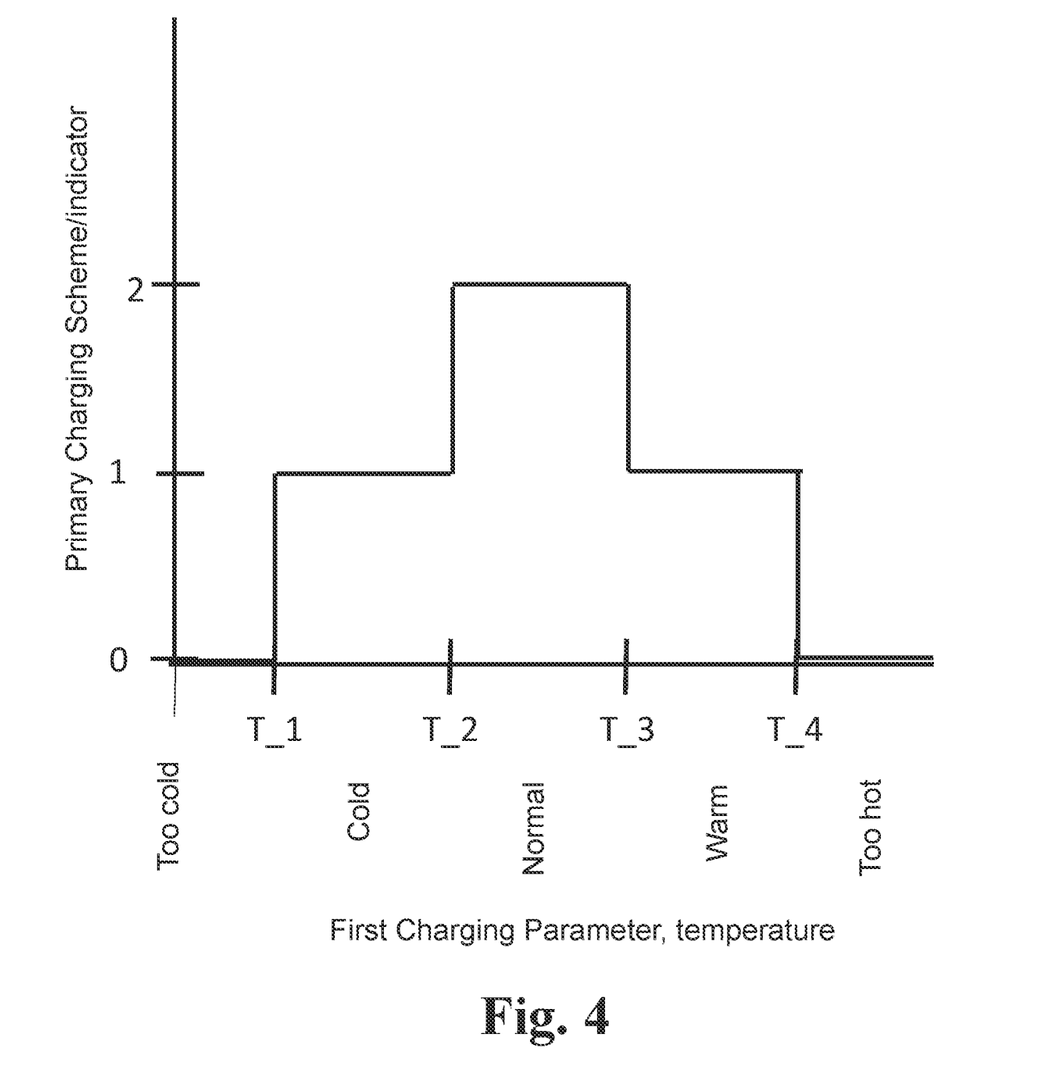
FIG. 4 illustrates charging schemes based on temperature thresholds according to an embodiment of the disclosure.

FIG. 4 is an illustration of an example of determining a primary charging scheme based on first charging parameter.

As shown, the primary charging scheme can be based on first charging criterion, for example based on different temperature threshold ranges such as shown in FIG. 4.

The hearing device can determine a primary charging scheme based on the first charging parameter. For example, the primary charging scheme may vary in voltage or current from a normal voltage and current based on temperature, such as shown in FIG. 4.

In FIG. 4, a temperature $T\_HD$ (first charging parameter) less than $T\_1$ (too cold) or larger than $T\_4$ (too hot) is optionally mapped to an off-charging scheme, e.g. with the primary charging indicator being set to zero, such as "00" in a two-bit implementation of the charging indicator. In the off-charging scheme, no charging power is transmitted from the charging device. A temperature (first charging parameter) in the range from $T\_1$ to $T\_2$ (cold) or in the range from $T\_3$ to $T\_4$ (hot) may be mapped to an intermediate-charging scheme with reduced energy charging, e.g. with the primary charging indicator being set to one, such as "01" in a two-bit implementation of the charging indicator. A temperature (first charging parameter) in the range from $T\_2$ to $T\_3$ (normal) may be mapped to a normal-charging scheme or default charging scheme, e.g. with the primary charging indicator being set to two, such as "10" in a two-bit implementation of the charging indicator.

In other words, a first charging criterion may be given as or at least based on:

$$T\_HD < T\_1 \text{ OR } T\_HD > T\_4,$$

wherein the first charging scheme is an off-charging scheme. An exemplary value of $T\_1$ is 0° C. and an exemplary value of $T\_4$ is 56° C.

Further, a second charging criterion may be given as or at least based on:

$$T\_2 < T\_HD < T\_3$$

wherein the second charging scheme is a normal-charging scheme. An exemplary value of $T\_2$ is 0° C. or 10° C. and an exemplary value of $T\_3$ is 46° C. or 56° C.

A third charging criterion may be given as or at least based on:

$$T\_1 =< T\_HD =< T\_2 \text{ or } T\_3 =< T\_HD =< T\_4$$

wherein the third charging scheme is an intermediate-charging scheme, e.g. where the charging power is a reduced charging power compared to the normal or default charging power, such as a fraction e.g. in the range from 20 to 80% of the charging power in the normal-charging scheme.

In other words, the charging controller of the hearing device may be configured to determine if a third charging criterion based on the first charging parameter and/or the second charging parameter is satisfied, and in accordance with the third charging criterion being satisfied, select a third charging scheme with associated third charging indicator from a set of charging schemes as the primary charging scheme.

Also disclosed are hearing device, methods, and charging device according to any of the following items.

Item 1. A hearing device comprising:

an interface comprising a wireless transceiver configured for wireless communication with a charging device; and a power module comprising a charging controller and a receiving coil for wireless charging of a battery positioned in the hearing device, wherein the charging controller is configured to: obtain a first charging parameter; determine a primary charging scheme based on the first charging parameter; and transmit a primary charging indicator indicative of the primary charging scheme via the wireless transceiver.

Item 2. Hearing device according to Item 1, the hearing device comprising a temperature sensor, and wherein the first charging parameter is indicative of a temperature in the hearing device.

Item 3. Hearing device according to any of Items 1-2, wherein the primary charging indicator is indicative of a charging power and/or a duty cycle of the primary charging scheme.

Item 4. Hearing device according to any of Items 1-3, wherein to determine a primary charging scheme comprises to determine if a first charging criterion based on the first charging parameter is satisfied, and in accordance with the first charging criterion being satisfied, select a first charging scheme with associated first charging indicator from a set of charging schemes as the primary charging scheme.

Item 5. Hearing device according to Item 4 as dependent on Item 2, wherein the first charging criterion is satisfied if the temperature is larger than a first threshold and/or less than a second threshold, and the first charging scheme has a reduced charging power.

Item 6. Hearing device according to any of Items 1-5, wherein the charging controller is configured to obtain a second charging parameter and wherein to determine a primary charging scheme comprises to determine if a second charging criterion based on the first charging parameter and/or the second charging parameter is satisfied, and in accordance with the second charging criterion being satisfied, select a second charging scheme with associated second charging indicator from a set of charging schemes as the primary charging scheme.

Item 7. Hearing device according to Item 6, wherein the second charging parameter is indicative of a battery level in the hearing device, the second charging criterion is satisfied if a change in the battery level over time is less than a second threshold, and the second charging scheme has an increased charging power.

Item 8. Hearing device according to any of Items 1-7, wherein the primary charging scheme is based on a current charging scheme.

Item 9. Hearing device according to any of Items 1-8, wherein the primary charging indicator comprises multiple bits.

Item 10. Method of charging a hearing device comprising an interface comprising a wireless transceiver configured for wireless communication with a charging device, and a power module comprising a charging controller and a receiving coil for wireless charging of a battery positioned in the hearing device, wherein the method comprises:
  obtaining a first charging parameter;
  determining a primary charging scheme based on the first charging parameter; and
  transmitting a primary charging indicator indicative of the primary charging scheme via the wireless transceiver.

Item 11. A charging device for charging of a hearing device, the charging device comprising:
  an interface comprising a wireless transceiver configured for wireless communication with a hearing device; and
  a power module comprising a charging controller and a transmitting coil for wireless transfer of power to a receiving coil of the hearing device;
  wherein the charging controller is configured to: apply a default charging scheme in the power module; receive a primary charging indicator from the hearing device via the wireless transceiver; determine if the primary charging indicator is indicative of a change in charging scheme; in accordance with a determination that the primary charging indicator is indicative of a change in charging scheme, select a primary charging scheme based on the primary charging indicator; and apply the primary charging scheme in the power module.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in the order presented.

Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2 hearing device
3 processing unit
4 main power source, battery
8 first power supply
10 interface
12 first power output terminal of main power source
13 wireless transceiver
14 first power rail
16 second power output terminal of main power source
18 second power rail
24 power input terminal of first power supply
26 first wireless signal, wireless connection
28 electrical signal to the processing unit
30 electrical signal to the interface
32 power input terminal of interface
34 transceiver power rail
36 power output terminal of first power supply
40 power module
42 charging controller
44 receiving coil
46 wireless charging
48 connection
50 temperature sensor
52 voltage/current sensor
52 primary charging indicator, charging indicator(s)
54 microphone
60A first input signal
62 output signal
64 receiver
64A audio output signal
100 charging device
102 interface
104 wireless transceiver
106 power module
108 charging controller
110 transmitting coil
120 wireless transfer of power
122 receive a primary charging indicator
200 method for power supply management of a hearing device
202 obtaining charging parameter(s)
202A obtaining a first charging parameter
202B obtaining a second charging parameter
204 determining a primary charging parameter
206 transmitting a primary charging indicator

The invention claimed is:

1. A hearing device configured to be worn at an ear of a user, the hearing device comprising:
    an interface comprising a wireless transceiver configured for wireless communication with a charging device;
    a power module comprising a charging controller and a coil for wireless charging a battery for the hearing device; and
    a temperature sensor configured to provide temperature data;
    wherein the charging controller is configured to: obtain the temperature data as a first charging parameter indicative of a temperature associated with the hearing device, and determine a primary charging scheme based on the first charging parameter; and
    wherein the wireless transceiver is configured to transmit a primary charging indicator indicative of the primary charging scheme.

2. The hearing device according to claim 1, wherein the charging controller is configured to transmit a primary charging indicator indicative of the primary charging scheme via the wireless transceiver, and wherein the primary charging indicator is indicative of a charging power and/or a duty cycle.

3. The hearing device according to claim 1, wherein the first charging scheme is associated with a first charging indicator.

4. The hearing device according to claim 1, wherein the charging controller is configured to determine the first criterion as being satisfied if the temperature is larger than a first threshold and/or less than a second threshold.

5. The hearing device according to claim 1, wherein the charging power level associated with the first charging scheme is less than a charging power level associated with a current charging scheme.

6. The hearing device according to claim 1, wherein the charging controller is configured to determine whether a second criterion is satisfied based on the first charging parameter and/or a second charging parameter.

7. The hearing device according to claim 6, wherein the second charging parameter is indicative of a battery level.

8. The hearing device according to claim 6, wherein the charging controller is configured to determine the second criterion as being satisfied if a change in a battery level over time is less than a threshold.

9. The hearing device according to claim 1, wherein the charging controller is configured to obtain a second charging parameter.

10. The hearing device according to claim 9, wherein the second charging parameter is indicative of a battery level.

11. The hearing device according to claim 1, wherein the temperature associated with the hearing device is a temperature in the hearing device.

12. A hearing device configured to be worn at an ear of a user, the hearing device comprising:
    an interface comprising a wireless transceiver configured for wireless communication with a charging device;
    a power module comprising a charging controller and a coil for wireless charging a battery for the hearing device; and
    a temperature sensor configured to provide temperature data;
    wherein the charging controller is configured to obtain the temperature data as a first charging parameter indicative of a temperature associated with the hearing device;
    wherein the charging controller is configured to determine whether a first criterion is satisfied based on the first charging parameter, and in accordance with the first criterion being satisfied, select a first charging scheme from a set of charging schemes as a primary charging scheme; and
    wherein the charging controller is configured to determine whether a second criterion is satisfied based on the first charging parameter and/or a second charging parameter, and wherein the charging controller is configured to select a second charging scheme from the set of charging schemes as the primary charging scheme if the second criterion is satisfied.

13. The hearing device according to claim 12, wherein the second charging scheme has an increased charging power compared to a current charging scheme.

14. A hearing device configured to be worn at an ear of a user, the hearing device comprising:
- an interface comprising a wireless transceiver configured for wireless communication with a charging device;
- a power module comprising a charging controller and a coil for wireless charging a battery for the hearing device; and
- a temperature sensor configured to provide temperature data;
- wherein the charging controller is configured to: obtain the temperature data as a first charging parameter indicative of a temperature associated with the hearing device, determine a primary charging scheme based on the first charging parameter, and transmit a primary charging indicator indicative of the primary charging scheme via the wireless transceiver; and
- wherein the primary charging scheme is based on a current charging scheme.

15. A hearing device configured to be worn at an ear of a user, the hearing device comprising:
- an interface comprising a wireless transceiver configured for wireless communication with a charging device;
- a power module comprising a charging controller and a coil for wireless charging a battery for the hearing device; and
- a temperature sensor configured to provide temperature data;
- wherein the charging controller is configured to: obtain the temperature data as a first charging parameter indicative of a temperature associated with the hearing device, determine a primary charging scheme based on the first charging parameter, and transmit a primary charging indicator indicative of the primary charging scheme via the wireless transceiver; and
- wherein the primary charging indicator comprises multiple bits.

* * * * *